(12) United States Patent
Mason

(10) Patent No.: US 10,043,310 B2
(45) Date of Patent: Aug. 7, 2018

(54) SMOOTHING EDGES OF A MESH

(71) Applicant: Electronic Arts Inc., Redwood City, CA (US)

(72) Inventor: Ashton Mason, Twickenham (GB)

(73) Assignee: Electronic Arts Inc., Redwood City, CA (US)

( * ) Notice: Subject to any disclaimer, the term of this patent is extended or adjusted under 35 U.S.C. 154(b) by 211 days.

(21) Appl. No.: 15/074,740

(22) Filed: Mar. 18, 2016

(65) Prior Publication Data

US 2016/0292916 A1   Oct. 6, 2016

Related U.S. Application Data

(60) Provisional application No. 62/140,338, filed on Mar. 30, 2015.

(51) Int. Cl.
*G06T 17/20* (2006.01)
*G06T 19/20* (2011.01)

(52) U.S. Cl.
CPC .......... *G06T 17/205* (2013.01); *G06T 17/20* (2013.01); *G06T 19/20* (2013.01)

(58) Field of Classification Search
CPC ........... G06T 17/20; G06T 17/00; G06T 7/12; G06T 17/30; G06T 5/002; G06T 7/11; G06T 15/08
See application file for complete search history.

(56) References Cited

U.S. PATENT DOCUMENTS

| 8,698,809 B2 | 4/2014 | Hamedi et al. |
| 8,860,723 B2 | 10/2014 | Johansson et al. |
| 2006/0197760 A1* | 9/2006 | Yamada .................. G06T 17/20 345/423 |
| 2010/0004770 A1* | 1/2010 | Rameau .................. G06F 17/50 700/98 |
| 2010/0259540 A1* | 10/2010 | Loop ....................... G06T 15/40 345/423 |
| 2011/0175911 A1* | 7/2011 | Loop ..................... G06T 15/005 345/423 |

(Continued)

FOREIGN PATENT DOCUMENTS

| EP | 2909813 A1 | 8/2015 |
| WO | 20140869025 A1 | 6/2014 |

(Continued)

OTHER PUBLICATIONS

Daniels et al., "Quadrilateral Mesh Simplification", ACM Transactions on Graphics (TOG)—Proceedings of ACM SIGGRAPH Asia 2008, vol. 27 Issue 5, 9 pages, published in Dec. 2008, New York, NY, USA.

(Continued)

*Primary Examiner* — Jeffrey Chow

(74) *Attorney, Agent, or Firm* — Lowenstein Sandler LLP

(57) ABSTRACT

A mesh that includes a polychord with edges may be received. A first mesh simplification operation may be performed with the mesh to remove the edges of the polychord and to generate a first simplified mesh. Guide planes may be generated based on the first simplified mesh. Furthermore, a second mesh simplification operation may be performed with a combination of the mesh with the guide planes to remove the edges of the polychord based on the guide planes and to generate a second simplified mesh.

20 Claims, 13 Drawing Sheets

(56) References Cited

U.S. PATENT DOCUMENTS

2014/0111510 A1 4/2014 Lindahl et al.
2014/0160121 A1 6/2014 Johansson et al.
2014/0198103 A1 7/2014 Johansson et al.

FOREIGN PATENT DOCUMENTS

| WO | 2014111221 A3 | 7/2014 |
| WO | 2009096891 A1 | 8/2014 |
| WO | 2014060585 A1 | 8/2015 |
| WO | 2016005147 A1 | 1/2016 |

OTHER PUBLICATIONS

Garland et al., "Simplifying Surfaces with Color and Texture using Quadric Error Metrics", IEEE Computer Society Press, pp. 263-269, published in 1998, Los Alamitos, CA, USA.

Garland et al., "Surface Simplification Using Quadric Error Metrics", SIGGRAPH '97, Proceedings of the 24th annual conference on Computer graphics and interactive techniques, pp. 209-216, published in 1997, ACM Press/Addison-Wesley Publishing Co., New York, NY, USA.

\* cited by examiner

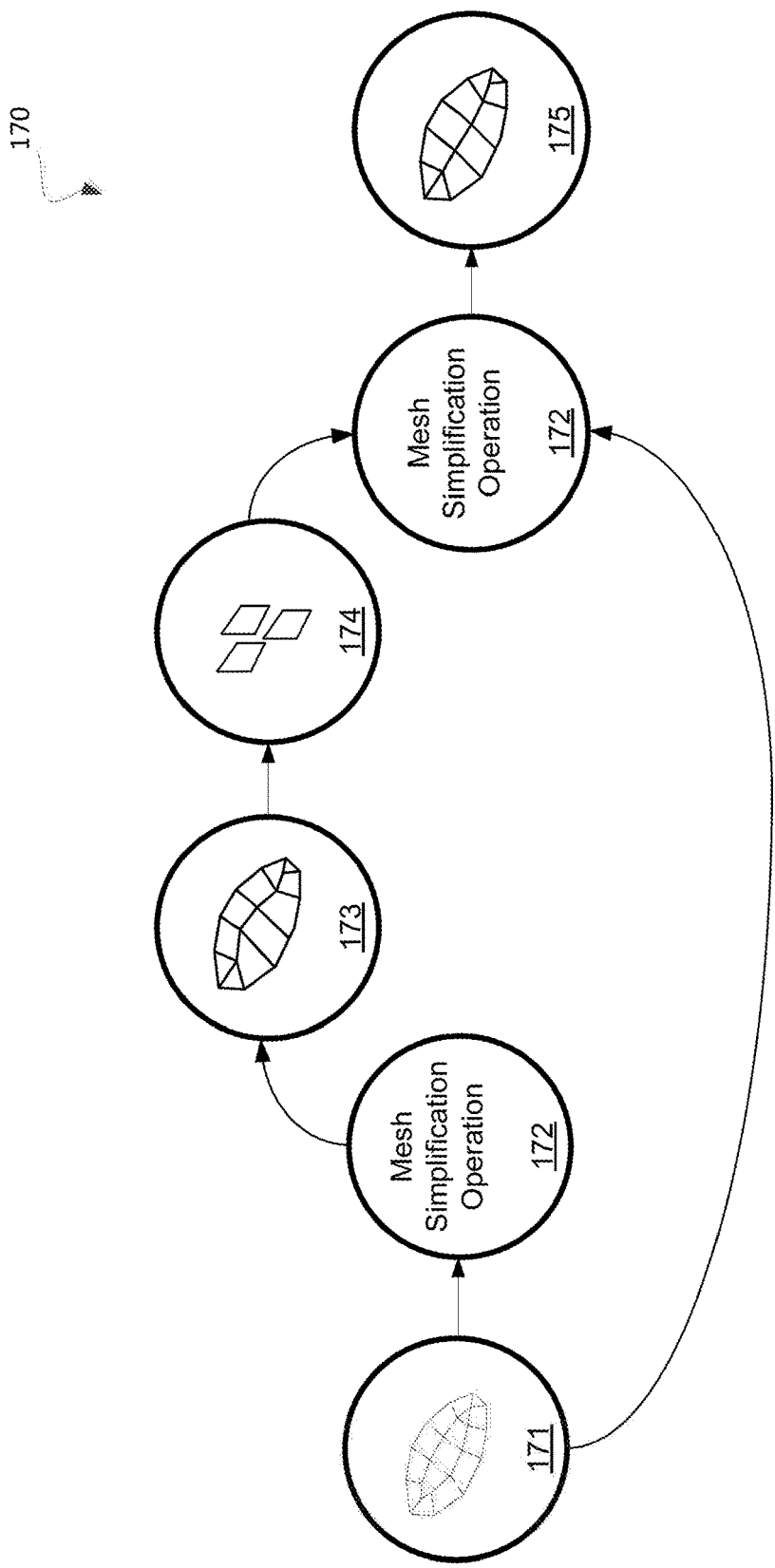

SMOOTHING EDGES OF A MESH

RELATED APPLICATION

This application is related to and claims the benefit of U.S. Provisional Patent Application No. 62/140,338, filed Mar. 30, 2015, which is hereby incorporated by reference.

TECHNICAL FIELD

The present disclosure is generally related to meshes, and more particularly, to smoothing edges of a mesh.

BACKGROUND

A mesh may be used to represent an object in three-dimensional (3D) graphics. The mesh may be a group of faces, edges, and vertices that define the shape of the object. The faces may be of various shapes such as triangles, quadrilaterals, and other types of polygons. A process known as mesh simplification, which may transform the mesh into another mesh with fewer faces, edges, and vertices, may reduce complexity of the mesh. The simpler mesh with fewer faces, edges, and vertices, may be graphically rendered with less computing resources than the more complex mesh.

BRIEF DESCRIPTION OF THE DRAWINGS

The present disclosure is illustrated by way of example, and not by way of limitation, and can be more fully understood with reference to the following detailed description when considered in connection with the figures as described below.

FIG. 1D illustrates an example workflow to generate an adjusted simplified mesh in accordance with some embodiments of the present disclosure.

DETAILED DESCRIPTION

Figure 1A:
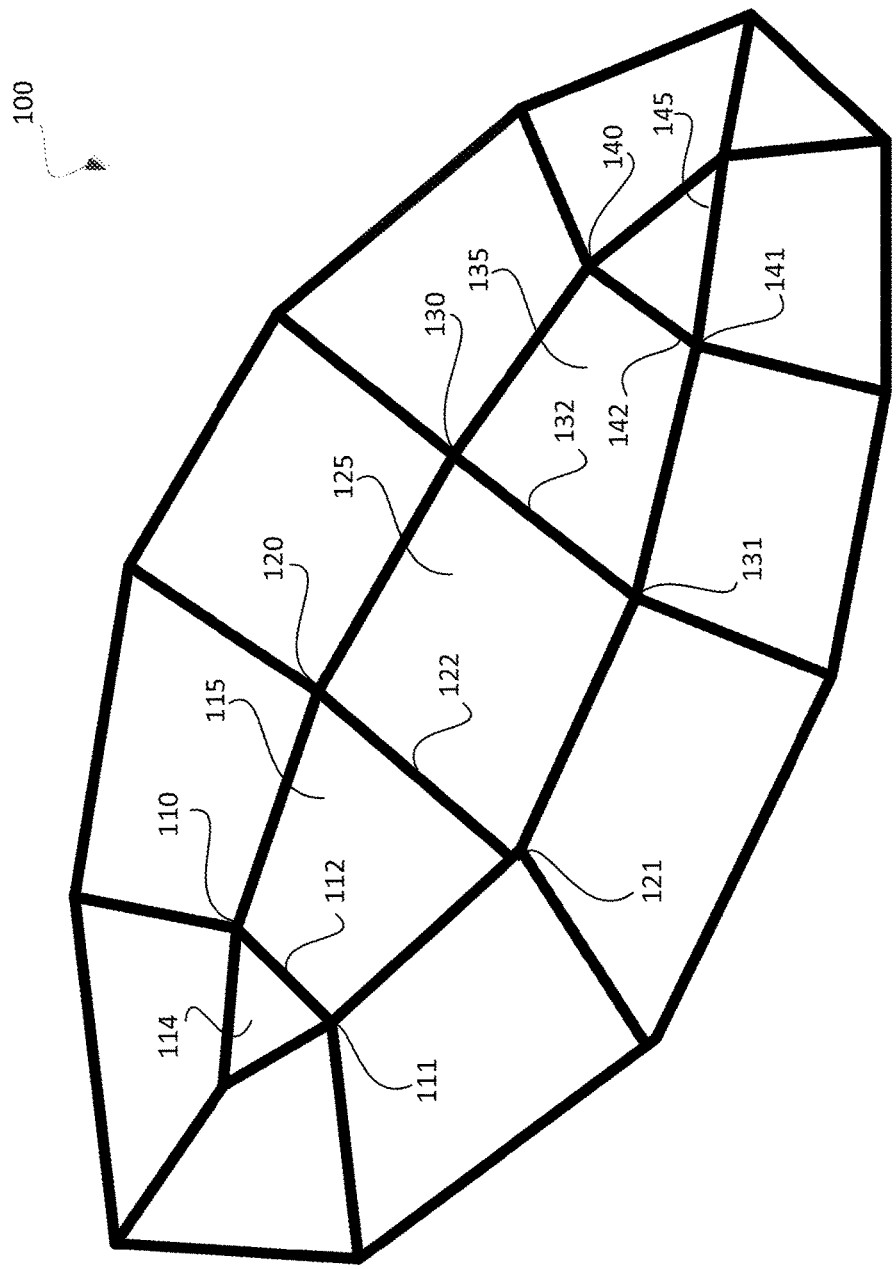
FIG. 1A illustrates an example of a mesh in accordance with some embodiments of the present disclosure.

Aspects of the present disclosure relate to the collapsing of an edge of a polychord based on a guide plane. In general, a mesh may include multiple edges, vertices, and faces that are used to render 3D computer graphics. The faces of the mesh may include triangles, quadrilaterals, or other such polygonal shapes. A vertex of the mesh may refer to a location or position within the mesh and an edge may refer to a connection between two of the vertices. A face of the mesh may refer to a closed set of edges so that a triangular face includes three of the edges and a quadrilateral (also referred to as a quad) face includes four of the edges of the mesh.

A mesh may be used to represent the shape of an object in 3D computer graphics. Mesh simplification may be used to render the 3D computer graphics more efficiently. For example, in a video game, when an object in the video game is viewed at a larger distance, then a simpler mesh may be used to render the graphics of the object as opposed to using a more complex mesh when the object is viewed at a shorter distance within the video game. A simpler mesh may include fewer faces, vertices, and edges than a more complex mesh. Such differences may improve performance of a video game as the rendering of the graphics of a simpler mesh may require less computing power than rendering of the graphics of a more complex mesh.

A mesh with quadrilateral faces (also referred to as a quadrilateral mesh) may include a sequence of edges that are separated or connected by quadrilateral faces. Such a sequence of mesh edges that are connected by quadrilateral faces may be referred to as a polychord. In order to simplify a mesh, a process known as edge collapse may be performed on the mesh to replace an edge of the mesh with a vertex. A polychord collapse may be used to collapse the edges of a polychord where multiple edges or each edge of a polychord is collapsed. The edges of a polychord may be arranged to create a smooth pattern within the mesh. However, when a polychord collapse operation that is performed on the polychord simplifies the mesh by replacing edges of the polychord with vertices, the locations of the vertices in the simplified mesh may be in locations that are out of line with respect to the original edges of the polychord (e.g., before the mesh is simplified). Such vertices being used to replace the edges may result in the simplified mesh being irregular or not smooth with respect to the edges of the mesh before it is simplified.

Guide planes may be used to address the above and other deficiencies in order to simplify a mesh with polychords so that the vertices of the collapsed polychord are within a line that is more representative of the original edges of the polychord before it is collapsed during mesh simplification. The guide planes may be sufficient to move or nudge collapsed locations or points of vertices into a smooth line when the edges that are collapsed lie within roughly planar surfaces such that there is considerable freedom in the exact location of the collapse locations of the vertices. Furthermore, the additional contribution of the guide planes may have little negative impact on the overall shape of the mesh in situations where the optimal locations of the collapse locations or points of vertices are already constrained by the presence in the local mesh surface of hard or feature edges on which the collapse vertices may be located.

A first polychord collapse operation may be performed on a polychord to determine locations of a first set of vertices that are used to replace edges of the polychord. Parametric line values may be determined based on the locations of the first set of vertices relative to the locations of the pairs of vertices that were connected by the edges of the polychord that are collapsed by the polychord collapse operator. Thus, the parametric line values may be determined based on the locations of the first set of vertices relative to the vertices of the mesh before the mesh is simplified.

The parametric line values may subsequently be smoothed or adjusted relative to each other. For example, a parametric line value for a particular vertex from the first set of vertices may be adjusted based on parametric line values of adjacent vertices from the first set of vertices. The smoothed parametric line values may be used to position guide planes used in the calculation of improved locations for the collapse vertices of a polychord. After determining the smoothed parametric line values, the guide planes may be provided as a new input to the polychord collapse operation in conjunction with the mesh before simplification. For example, the polychord collapse operation may then be performed to collapse a polychord of the mesh by simplifying the mesh with the guide planes used as additional input to the polychord collapse operation. The addition of the guide planes may adjust the location of the vertices that replace the edges of the polychord during mesh simplification so that the new locations of the vertices are in a straighter and smoother line relative to the edges of the polychord of the mesh before it is simplified.

FIG. 1A illustrates an example of a mesh 100. In general, the mesh 100 may correspond to a polygonal mesh that is used to render 3D computer graphics of an object. The mesh 100 may correspond to a mesh before the performance of any simplification operation. In some embodiments, the rendered object may be displayed in a video game. The mesh 100 may be one mesh of multiple meshes of multiple objects that are to be rendered. Additionally, the mesh 100 may include multiple faces, edges, and vertices. For example, the mesh 100 may include a polychord that is bound by triangular faces 114 and 145 and includes quadrilateral faces 115, 125, and 135. The polychord may thus correspond to a group of adjacent quadrilateral faces. As shown, the polychord of the mesh 100 may include a first edge 112, second edge 122, third edge 132, and a fourth edge 142, each of which are to be collapsed in a polychord collapse operation to simplify the mesh 100. The first edge 112 may connect first and second vertices 110 and 111, the second edge 122 may connect the third and fourth vertices 120 and 121, the third edge 132 may connect the fifth and sixth vertices 130 and 131, and the fourth edge 142 may connect the seventh and eighth vertices 140 and 141. The vertices 110, 111, 120, 121, 130, 131, 140, and 141 may be original vertices of the mesh before a polychord collapse operation or other such simplification operation is performed on the mesh 100.

As such, the mesh 100 may represent a polygonal mesh with a polychord that has not been simplified by a polychord collapse operation. The mesh 100 may be used to render 3D computer graphics of an object in a video game that is viewed with a shorter distance within the video game or other such computer program.

Figure 1B:
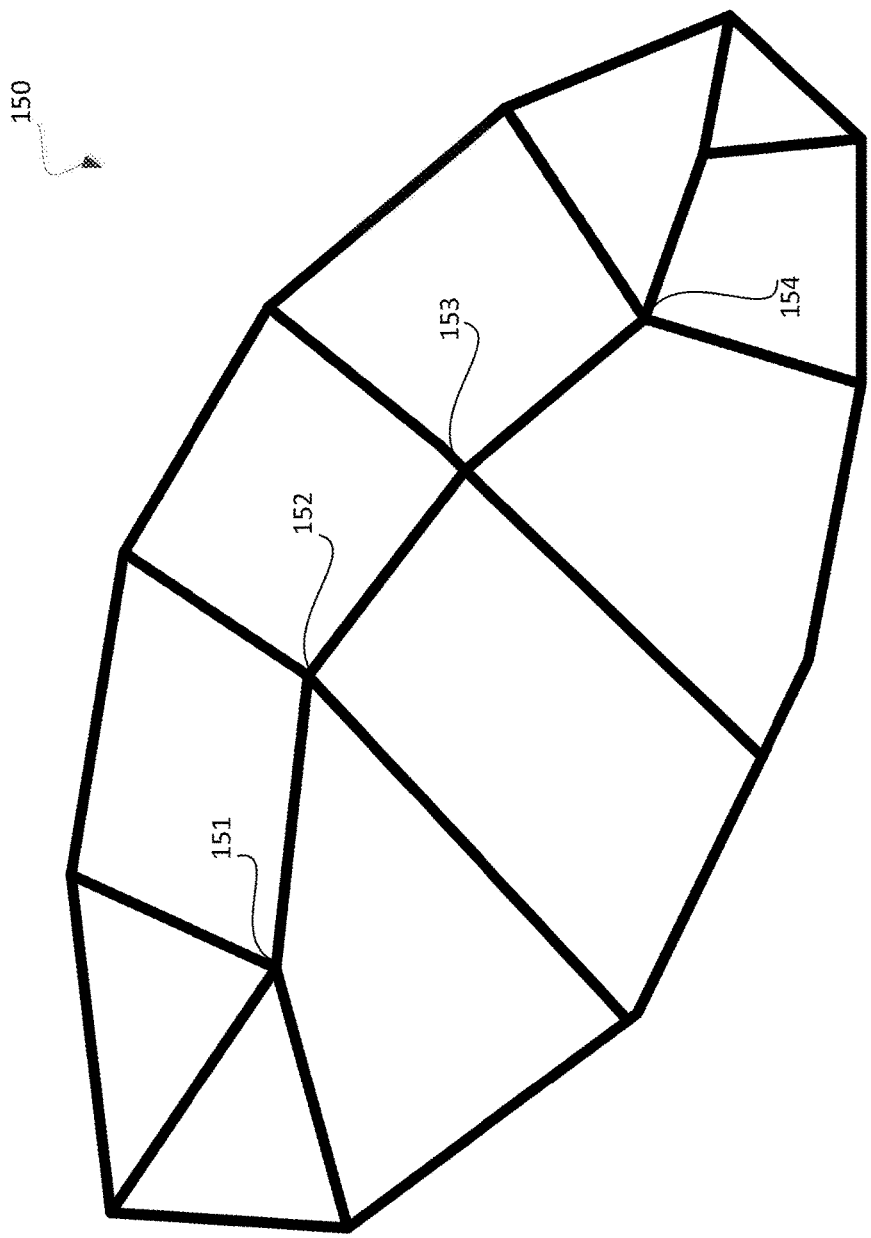
FIG. 1B illustrates an example of an unadjusted simplified mesh in accordance with some embodiments.

FIG. 1B illustrates an example of an unadjusted simplified mesh 150. In general, the unadjusted simplified mesh 150 may correspond to the mesh 100 of FIG. 1A after the performance of a polychord collapse operation to simplify the mesh 100 to collapse the edges of the polychord.

As shown in FIG. 1B, the unadjusted simplified mesh 150 may include a new first set of vertices 151, 152, 153, and 154 that have replaced the edges 112, 122, 132, and 142, respectively, from the mesh 100. For example, after a polychord collapse operation is performed on the mesh 100, the faces 114, 115, 125, 135, and 145 may be removed and the new first set of vertices 151, 152, 153, and 154 are added when the edges 112, 122, 132, and 142 of the polychord are collapsed. The new first set of vertices may be referred to as naïve vertices since the new first set of vertices are determined at locations without the use of guide planes as further described below. Furthermore, the naïve vertices or the first set of vertices may be referred to as collapse points. As illustrated, the new first set of vertices 151, 152, 153, and 154 may not be in a relatively smooth line within the unadjusted simplified mesh 150. For example, the locations of the new first set of vertices 151-154 may not be at locations that correspond to a smooth line that more accurately represents the faces 114, 115, 125, 135, and 144 of the mesh 100 that are removed during the polychord collapse operation.

As such, the unadjusted simplified mesh 150 may correspond to a mesh that has been simplified without guide planes being used as an additional input to the polychord collapse operation.

Figure 1C:
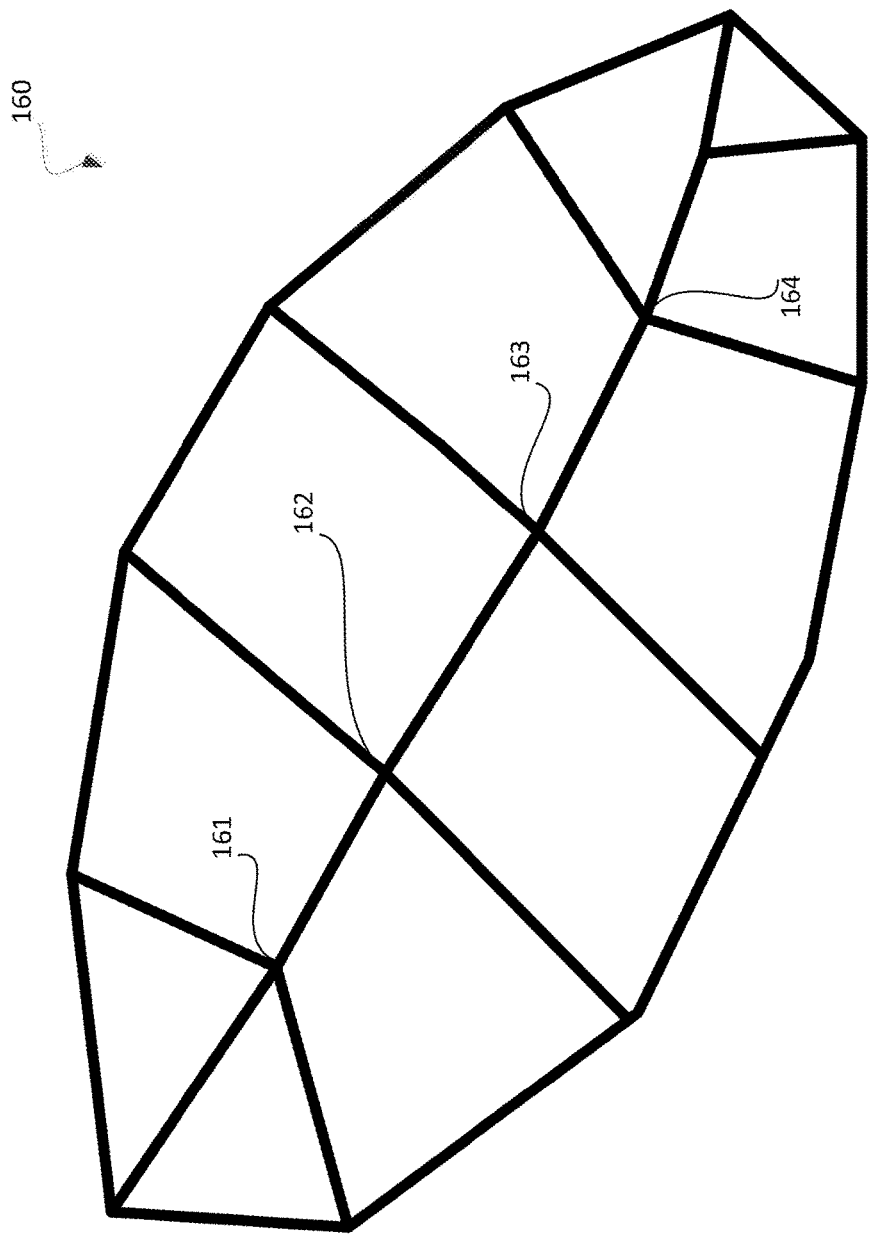
FIG. 1C illustrates an example of an adjusted simplified mesh in accordance with some embodiments of the present disclosure.

FIG. 1C illustrates an example of an adjusted simplified mesh 160. In general, the adjusted simplified mesh 160 may correspond to the mesh 100 of FIG. 1A after the performance of a polychord collapse operation with guide planes to simplify the mesh 100 by collapsing the edges of the polychord with the guide planes. The guide planes may be an additional input in conjunction with the mesh 100 based on locations of the naïve vertices of the mesh 160 of FIG. 1B.

As shown in FIG. 1C, the adjusted simplified mesh 160 may include an adjusted second set of vertices 161, 162, 163, and 164 in which the corresponding locations of the adjusted vertices are determined by guide planes and the mesh 100. As further described below, the guide planes may be associated with locations that are based on the locations of the new first set of vertices, or naïve vertices, 151-154. After the providing of the guide planes as an input, the polychord collapse operator may be performed on the mesh 100 with the guide planes to generate the adjusted simplified mesh 160. As illustrated, the adjusted second set of vertices 161, 162, 163, and 164 may be in a smoother and more of a straight line relative to the collapsed edges 112, 122, 132, and 142 as opposed to the new first set of vertices, or naïve vertices, 151, 152, 153, and 154. Thus, the adjusted simplified mesh 160 may collapse edges and replace the collapsed edges with the adjusted set of vertices (e.g., a second set of collapse points as opposed to a first set of collapse points corresponding to the naïve vertices). As described in further detail below, the smoothing of a first set of collapse points to determine the second set of collapse points may be performed while optimizing the collapsed mesh for geometric fidelity of the mesh. For example, the second collapse points or adjusted set of vertices may be smoother or more in line with the edges of the mesh that are removed during a collapse operation.

As such, a first mesh (e.g., mesh 100) may be subjected to a polychord collapse operation to generate a second mesh (e.g., mesh 150 or a first simplified mesh). The locations of the naïve vertices of the second mesh may be identified and locations associated with guide planes may be identified based on the naïve vertices of the second mesh. Subsequently, guide planes may be provided as an additional input with the first mesh based on the locations of the naïve vertices and the same polychord operation may be performed on the first mesh with inserted guide planes to generate a third mesh (e.g., mesh 160 or a second simplified mesh) that includes vertices that replaces edges so that a smoother line that is more representative of the removed faces or edges is included in the third mesh.

FIG. 1D illustrates an example workflow 170 to generate an adjusted simplified mesh. In general, workflow 170 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the workflow 170 corresponds to an execution flow of a guide plane component 950 of FIG. 9.

As shown in FIG. 1D, the workflow 170 may begin with a mesh 171 (e.g., mesh 100 of FIG. 1A) which may include a polychord and has not yet been simplified. A mesh simplification operation 172 may be performed on the mesh 171. For example, a polychord collapse operation 172 that is used to collapse multiple edges of the polychord may be performed on the mesh 171. The output of the mesh simplification operation 172 may be an unadjusted simplified mesh 173 (e.g., mesh 150 of FIG. 1B). The unadjusted simplified mesh 173 may be referred to as a first simplified mesh or a naïve simplified mesh. The unadjusted simplified mesh 173 may be used to generate one or more guide planes 174 to be used as an input for a second mesh simplification operation. The mesh simplification operation 172 may be performed based on the combination of the guide planes 174 and the mesh 171 to generate an adjusted simplified mesh 175 (e.g., mesh 160 of FIG. 1C). The adjusted simplified mesh 176 may be referred to as a second simplified mesh. In some embodiments, the mesh simplification operation 172 to generate the adjusted simplified mesh 176 may be a different mesh simplification operation than the prior mesh simplification operation to generate the unadjusted simplified mesh 173.

Thus, a first mesh simplification operation may be used to generate a first simplified mesh that is used to generate one or more guide planes. The guide planes may be used as an additional input along with the original mesh for a second mesh simplification operation to generate a second simplified mesh.

Figure 2:
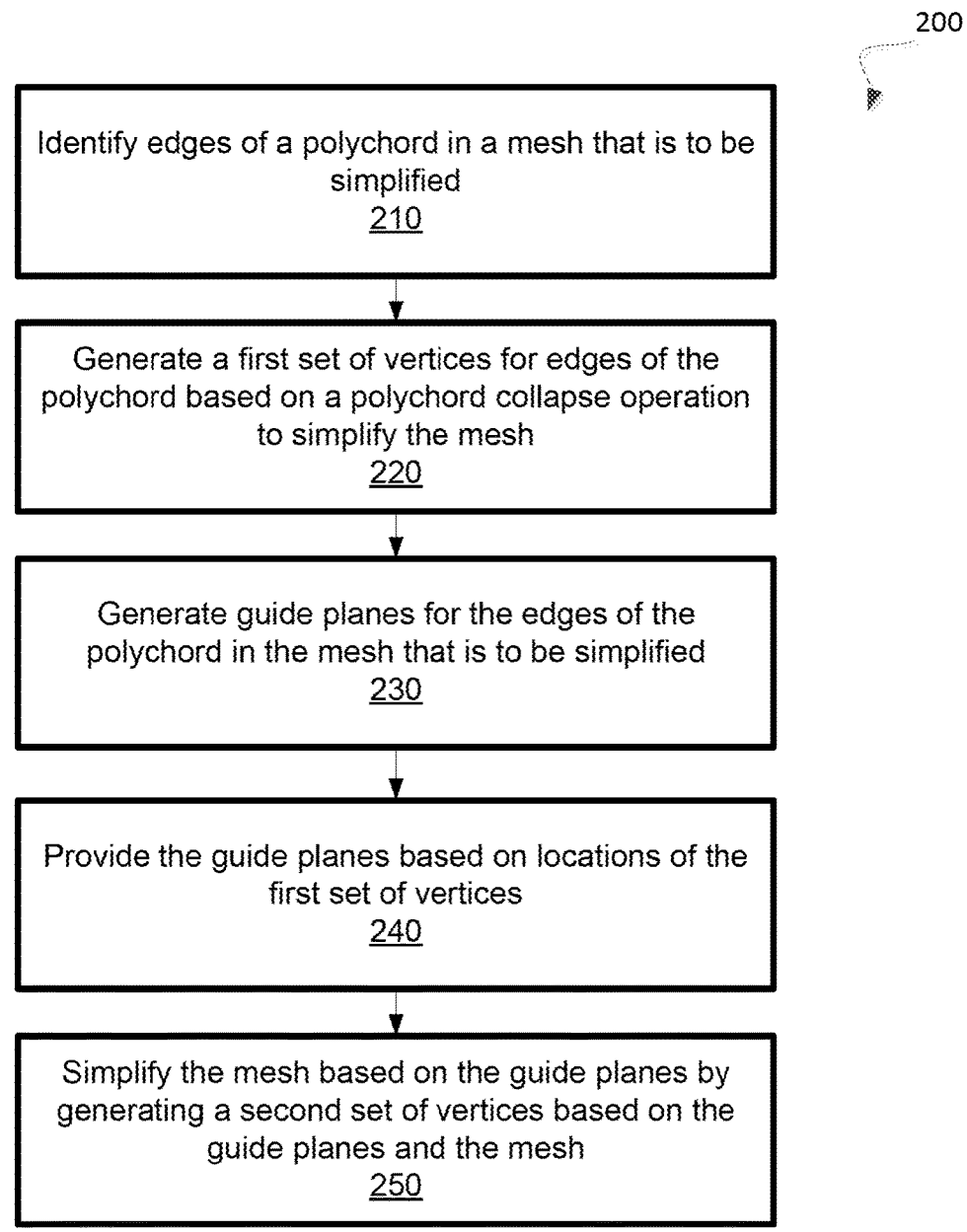
FIG. 2 is an example method to collapse an edge of a polychord based on a guide plane in accordance with one or more aspects of the present disclosure.

FIG. 2 is an example method 200 to collapse an edge of a polychord based on a guide plane. In general, the method 200 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 corresponds to an execution flow of a guide plane component 950 of FIG. 9.

As shown in FIG. 2, the method 200 may begin with the processing logic identifying edges of a polychord in a mesh that is to be simplified (block 210). For example, the edges of the polychord are to be collapsed into a set of vertices so that one or more faces of the polychord or mesh are to be removed. The processing logic may further generate a first set of vertices for the edges of the polychord based on a polychord collapse operation to simplify the mesh (block 220). For example, locations of a naïve set of vertices (i.e., collapse points) may be identified on the simplified mesh after a polychord collapse operation or other such mesh simplification process (e.g., a first mesh simplification operation). The processing logic may subsequently generate guide planes for the edges of the polychord in the mesh that is to be simplified (block 230). For example, guide planes of a particular size may be generated based on the average length of edges of the mesh. The processing logic may further provide the guide planes based on the locations of the first set of vertices (block 240). The guide planes may be based on locations that are based on the first set of vertices relative to the edges that are collapsed. For example, locations for providing guide planes may be based on the mesh that is earlier received (e.g., at block 210). The locations for providing the guide planes may be determined based on the locations of the first set of vertices relative to the pairs of vertices that bounded the edges that were collapsed. In some embodiments, the guide planes may be provided based on positions along the edges that are to be removed as part of the polychord collapse operation. Further details with regard to the generating of the guide planes are described in conjunction with FIG. 4.

The processing logic may subsequently simplify the mesh with the guide planes by generating a second set of vertices based on the guide planes (block 250). For example, a second mesh simplification operation may be performed on the mesh as a first input with the guide planes as a second input to the second mesh simplification operation.

As such, a polychord collapse operation may be performed on a mesh at a first time to determine locations of a first set of naïve vertices and guide planes may be provided based on the locations of the first set of naïve vertices. The polychord collapse operation may be performed for a second time on the mesh with the guide planes to generate a simplified mesh with adjusted vertices to replace edges of the collapsed polychord.

Figure 3:
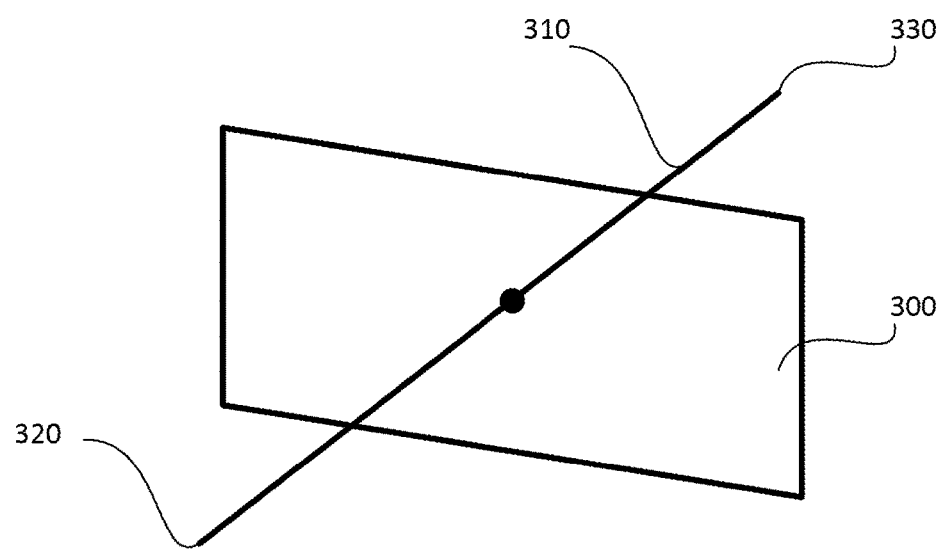
FIG. 3 illustrates an example of a guide plane in accordance with some embodiments.

FIG. 3 illustrates an example of a guide plane 300. In general, the guide plane 300 may be generated by the guide plane component 950 of FIG. 9 to generate an adjusted simplified mesh (e.g., mesh 160).

As shown in FIG. 3, the guide plane 300 may be a face. The guide plane 300 may be provided as an input based on an edge 310 of a mesh that connects a first vertex 320 with a second vertex 330. The location associated with the guide plane 300 on the edge 310 may be based on a smoothed parametric line value as described in further detail below. For example, the guide plane 300 may be associated with a location closer to the first vertex 320 or the second vertex 330 or beyond the first or second vertices 320 or 330 based on the smoothed parametric line value. Further details with regard to determining a location along the edge 330 to provide the guide plane 300 are described in conjunction with FIG. 4. Furthermore, the size or surface area of the guide plane 300 may be based on a size of the average face or edge of the mesh before the edge 330 is collapsed. For example, the guide plane 300 may be of a size at a fraction of the size of the average of the mesh that includes the polychord that is to be collapsed. In the same or alternative embodiments, the guide plane 300 may be at a size based on the length of the average edge of the mesh. For example, the guide plan 300 may be of a size that is a fraction of the length of the average edge of the mesh before an edge of a polychord is collapsed by a polychord collapse operation. In another embodiment, the guide plane 300 may be of a size that is based on the average edge length or the average face dimensions of the polychord that includes the edge that is to be collapsed. Furthermore, the guide plane 300 may be normal to the edge 310.

Figure 4:
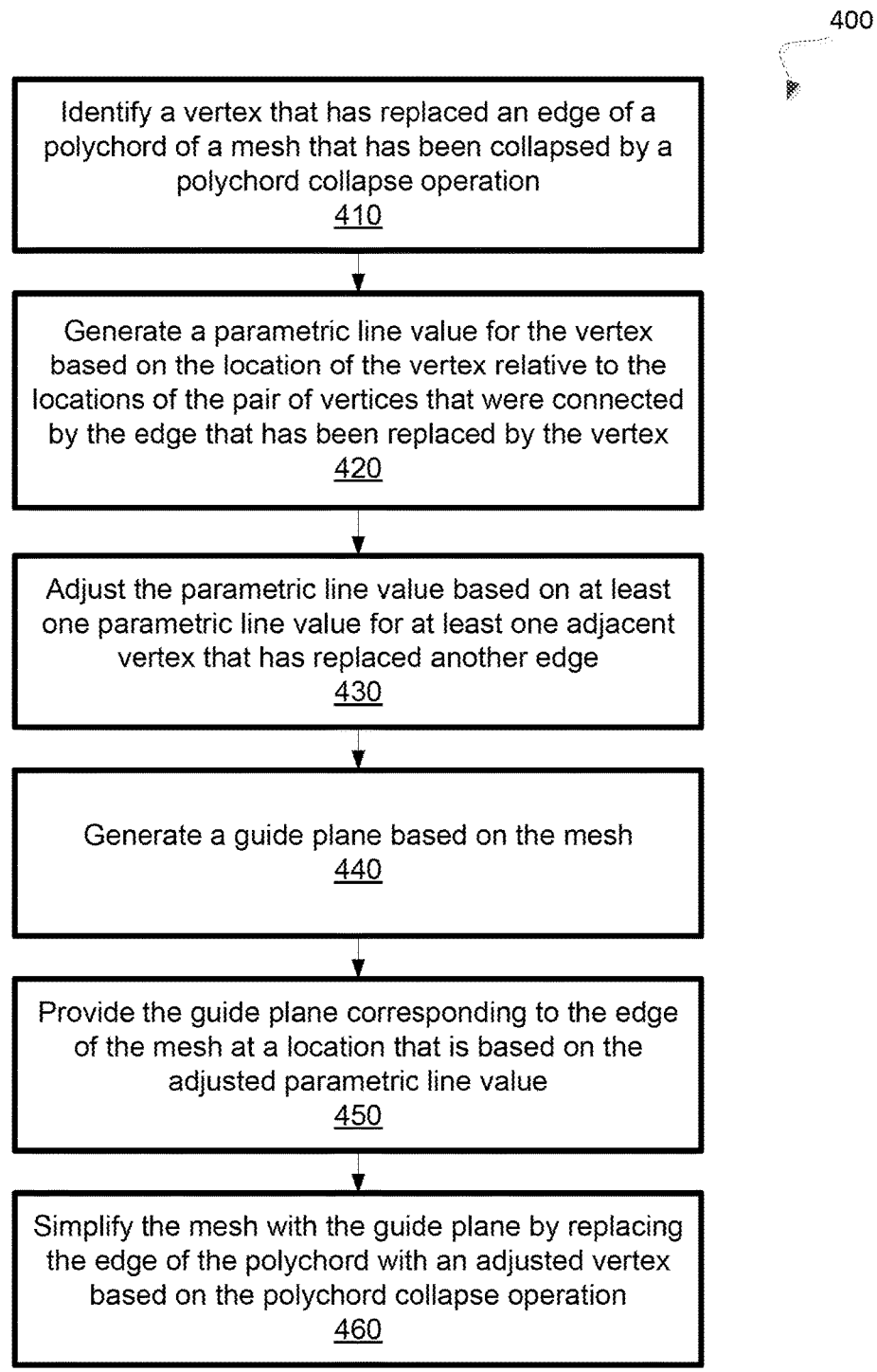
FIG. 4 is an example method to determine a location of a guide plane and to use the location to generate an adjusted simplified mesh in accordance with some embodiments of the present disclosure.

FIG. 4 is an example method 400 to determine a location of a guide plane and to use the location to generate an adjusted simplified mesh. In general, the method 400 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 corresponds to an execution flow by a guide plane component 950 of FIG. 9.

As shown in FIG. 4, the method 400 may begin with the processing logic identifying a vertex that has replaced an edge of a polychord of a mesh that has been collapsed by a polychord collapse operation (block 410). For example, a location of the vertex that has replaced the edge of the polychord as a result of the polychord collapse operation may be identified. In some embodiments, the polychord collapse operation may begin with identifying one or more polychords that are included in the mesh. The polychord collapse operation may be, but is not limited to, a Quadric Error Metric (QEM) process with a set of planes (e.g., quadrilateral faces of the mesh that are incident to the edge that is to be collapsed) as inputs to the quadric function where the collapsed vertex corresponding to the edge is placed at a location that approximates a geometric shape of the surface of the mesh around the edge that is to be collapsed. In some embodiments, a quadric value may be calculated for each vertex in the mesh or in the polychord of the mesh based on the faces of the mesh that are incident to the vertex. In response to collapsing an edge, a combined quadric value may be calculated for the edge based on a combination of the quadric values of the two vertices associated with the edge. The combined quadric value may represent the planes corresponding to the faces that are incident to either of the vertices that are connected by the edge. The collapse point of a vertex replacing the edge may be computed based on the combined quadric value.

The processing logic may further generate a parametric line value for the vertex based on the location of the vertex relative to the locations of the pair of vertices that were connected by the edge of the polychord that has been replaced by the vertex (block 420). For example, the vertex (which may also be referred to as the naïve vertex) may replace the edge that connected a first original vertex and a second original vertex. If the location of the vertex (e.g., the naïve vertex) is at the same location of the first original vertex, then the parametric line value for the first vertex may be set at a value of '0' and if the location of the first vertex is at the location of the second original vertex, then the parametric line value for the first vertex may be set at a value of '1.' If the location of the vertex is between the locations of the first and second original vertices, then the parametric line value of the vertex may be between the values of '0' and '1.' Furthermore, if the location of the vertex is beyond the location of the first original vertex, then the parametric line value of the vertex may be less than a value of '0' based on a distance of the vertex from the location of the first original vertex. If the location of the vertex is beyond the location of the second original vertex, then the parametric line value of the second vertex may be greater than the value of '1' based on the distance of the second vertex from the location of the second original vertex. Further details with regard to the determining of the parametric line values are described in conjunction with FIG. 5.

The processing logic may further adjust, or smooth, the parametric line value based on at least one other parametric line value for at least one other adjacent vertex that has replaced another edge (block 430). For example, a sliding window kernel filter may be applied to parametric line values for vertices so that a parametric line value for the vertex is averaged with the parametric line values of the one or two other vertices that are adjacent to the vertex. As such, a parametric line value for a vertex may be modified based on parametric line values of other vertices that replace other edges of the polychord. Further details with regard to the smoothing of parametric line values are described in conjunction with FIG. 6.

Furthermore, the processing logic may generate a guide plane based on the mesh (block 440). For example, a size of the guide plane may be based on a portion of the average face or average edge that is used in the mesh. The processing logic may further provide the guide plane for a location on the edge of the mesh that is based on the adjusted parametric line value (block 450). For example, the guide plane may be provided as another input with the mesh to the polychord collapse operation (e.g., the QEM process). The guide plane may be associated with a location between the pair of vertices that are connected by the edge to be collapsed if the smoothed parametric line value is between a value of '0' and '1' or may be beyond one of the vertices of the pair if the smoothed parametric line value is less than '0' (e.g., a negative number) and may be associated with a location beyond the other vertex of the pair of vertices if the smoothed parametric line value is larger than '1.' Further details with regard to the locations associated with the guide plane based on the smoothed parametric line value are described in conjunction with FIG. 7.

Referring to FIG. 4, the processing logic may subsequently simplify the mesh with the guide plane by replacing the edge of the polychord with an adjusted vertex based on the polychord collapse operation (block 460). For example, the polychord collapse operation may be performed again on the original mesh with the guide planes as another input so that the vertex points that replace the edges may be in a more smooth line relative to the edges or faces of the polychord that are removed.

As such, a polychord collapse operation may be performed to collapse an edge of a polychord. A naïve vertex may replace the edge. A parametric line value may be calculated based on the location of the naïve vertex relative to the original vertices of the collapsed edge that are replaced by the naïve vertex. The parametric line value may be smoothed or adjusted based on other parametric line values for other naïve vertices that have replaced other edges of the polychord. A guide plane may be generated based on the mesh and locations along the edges of the mesh that are based on the smoothed or adjusted parametric line values. The polychord collapse operation may be repeated on the mesh with the guide planes to determine adjusted vertices to replace edges of the polychord.

Figure 5:
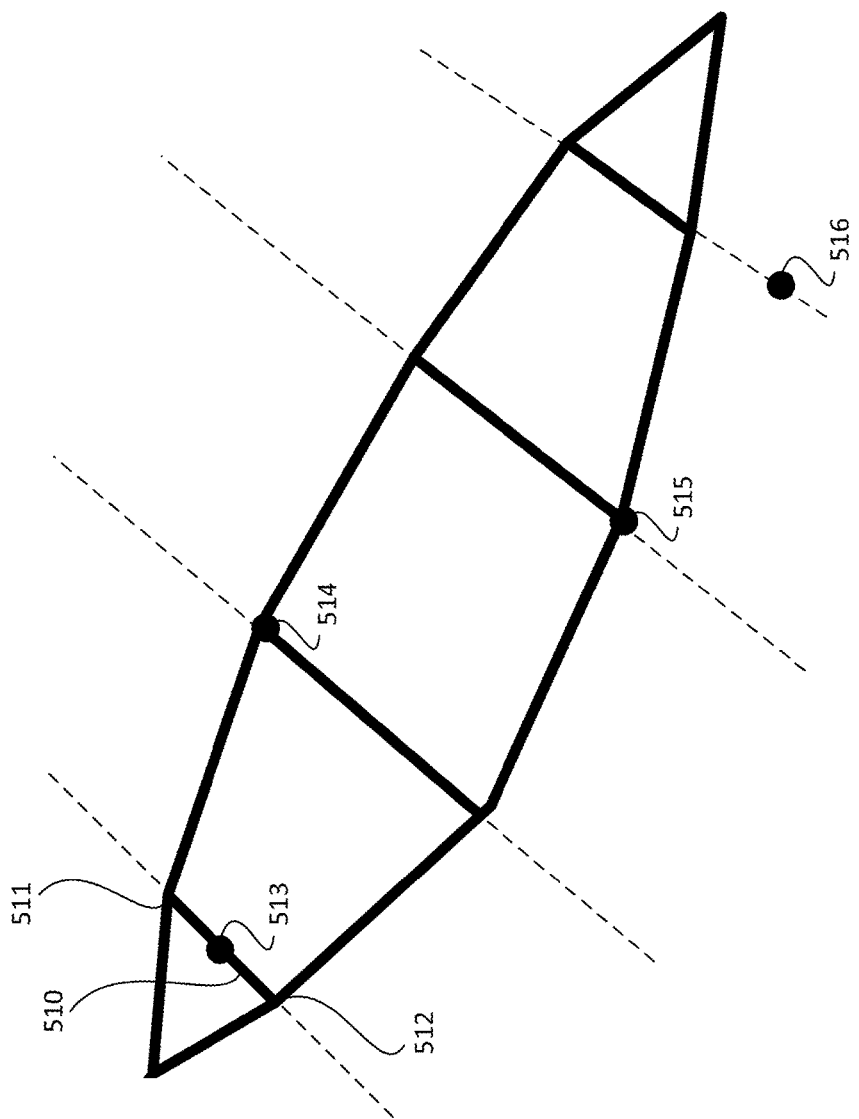
FIG. 5 illustrates an example of a determination of parametric line values of a mesh in accordance with some embodiments of the present disclosure.

FIG. 5 illustrates an example of a determination of parametric line values. In general, the parametric line values may be determined by the guide plane component 950 of FIG. 9.

As shown in FIG. 5, a first naïve vertex 513, second naïve vertex 514, third naïve vertex 515, and a fourth naïve vertex 516 may be determined to replace edges of a polychord of a mesh. Each of the first, second, third, and fourth naïve vertices may be at a position relative to the original vertices that were connected by the edge that is collapsed and replaced by the respective naïve vertex. For example, the first naïve vertex 513 may be between the first original vertex 511 and the second original vertex 512 of an edge 510 that the first naïve vertex 513 replaces in a polychord collapse operation. Similarly, the second naïve vertex 514 may be at one of the original vertices of another edge, the third naïve vertex 515 may be at another one of the original vertices of a different edge, and the fourth naïve vertex 516 may be beyond one of the original vertex points of its respective edge and not between the vertices.

Parametric line values may be calculated based on the locations of the naïve vertices relative to the original vertices of the edge that each naïve vertex has replaced. For example, the first parametric line value for the first naïve vertex 513 may be determined to be 0.5 as the first naïve vertex 513 is halfway between the pair of original vertices 511 and 512.

In some embodiments, an original vertex of an edge at a lower vertical position may be assigned a value of '0' and the other original vertex of the same edge at a higher vertical position may be assigned a value of '1.' Thus, the second naïve vertex 514 may have a parametric line value at a value of '1' (or another such positive number) since the second naïve vertex is at the same location of one of the original pairs of vertices at a higher vertical position while the third naïve vertex 515 may be at a value of '0' since the third naïve vertex is at the same location of another original vertex at a lower vertical position. The fourth naïve vertex 516 may be at a negative value since its corresponding location is below the original vertex of its edge that is at the lower vertical position. Another naïve vertex may be at a positive value that is greater than the value of '1' if its location is above the original vertex of its edge that is at the higher vertical position.

As an example, the first parametric line value for the first naïve vertex 513 may be calculated based on the location of the first naïve vertex 513 (e.g., the naïve collapse point) along the edge 510. An offset vector may be computed corresponding to the difference in location between the first naïve vertex 513 and the first original edge vertex 511. Additionally, a normalized direction vector may be computed as the normalized difference in location between the second original vertex 512 and the first original vertex 511 of the edge 510. A projected distance may then be calculated based on a dot product operation between the offset vector and the normalized direction vector. In some embodiments, the projected distance may indicate the projection of the offset vector onto the direction of the edge (e.g., a distance of the naïve vertex or collapse point down a length of the edge 510). An edge length may further be determined based on the difference in locations between the first original vertex 511 and the second original vertex 512. The parametric line value may then be calculated based on the projected distance divided by the edge length.

Figure 6:
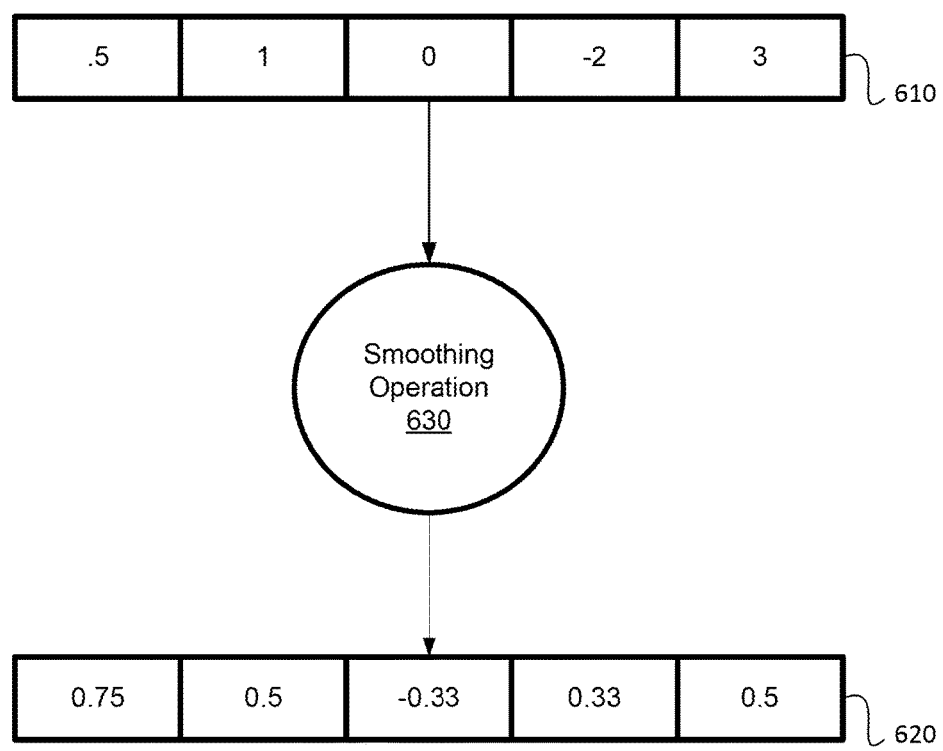
FIG. 6 illustrates an example of a smoothing of parametric line values of the mesh in accordance with some embodiments.

FIG. 6 illustrates an example of a smoothing of parametric line values of a mesh. In general, the parametric line values that are smoothed or adjusted may be based on the parametric line values that are determined based on the positions of the naïve vertices of FIG. 5. In some embodiments, the parametric line values may be smoothed or adjusted by the guide plane component 950 of FIG. 9.

The parametric line values 620 may be determined for first through fifth naïve vertices based on the location of each naïve vertex relative to the original vertices of the edge that it replaces. For example, the parametric line value for the first naïve vertex 513 may be determined based on its location relative to the first original vertex 511 and the second original vertex 512. As shown, the parametric line values for the first naïve vertex 513 may be 0.5, the parametric line value for the second naïve vertex 514 may be 1, the parametric line value for the third naïve vertex 515 may be 0, the parametric line value for the fourth naïve vertex 516 may be −2, and the parametric line value for a fifth naïve vertex may be 3.

A smoothing operation 620 may be performed on the parametric line values 610. In some embodiments, the smoothing operation 620 may correspond to a sliding window kernel filter that averages values of one of the parametric line values with other parametric line values. For example, a parametric line value of one of the naïve vertices may be averaged with the parametric line values of the naïve vertex to its left and the naïve vertex to its right. For example, as shown, for the first naïve vertex 513, the parametric line value of 0.5 may be averaged with the parametric line value of 1 to generate a smoothed parametric line value of 0.75. The parametric line value for the second vertex 514 may be averaged with the parametric line values 0.5 and 0 to generate a smoothed parametric line value of 0.5 (e.g., the average of 0.5, 1, and 0). Similarly, smoothed parametric line values of −0.33, 0.33, and 0.5 may be determined for the third naïve vertex 515, fourth naïve vertex 516, and a fifth naïve vertex. As such, smoothed parametric line values may be determined based on an average of one or more parametric line values that are associated with one or more adjacent naïve vertices, or collapse points, which have replaced one or more adjacent edges.

Figure 7A:
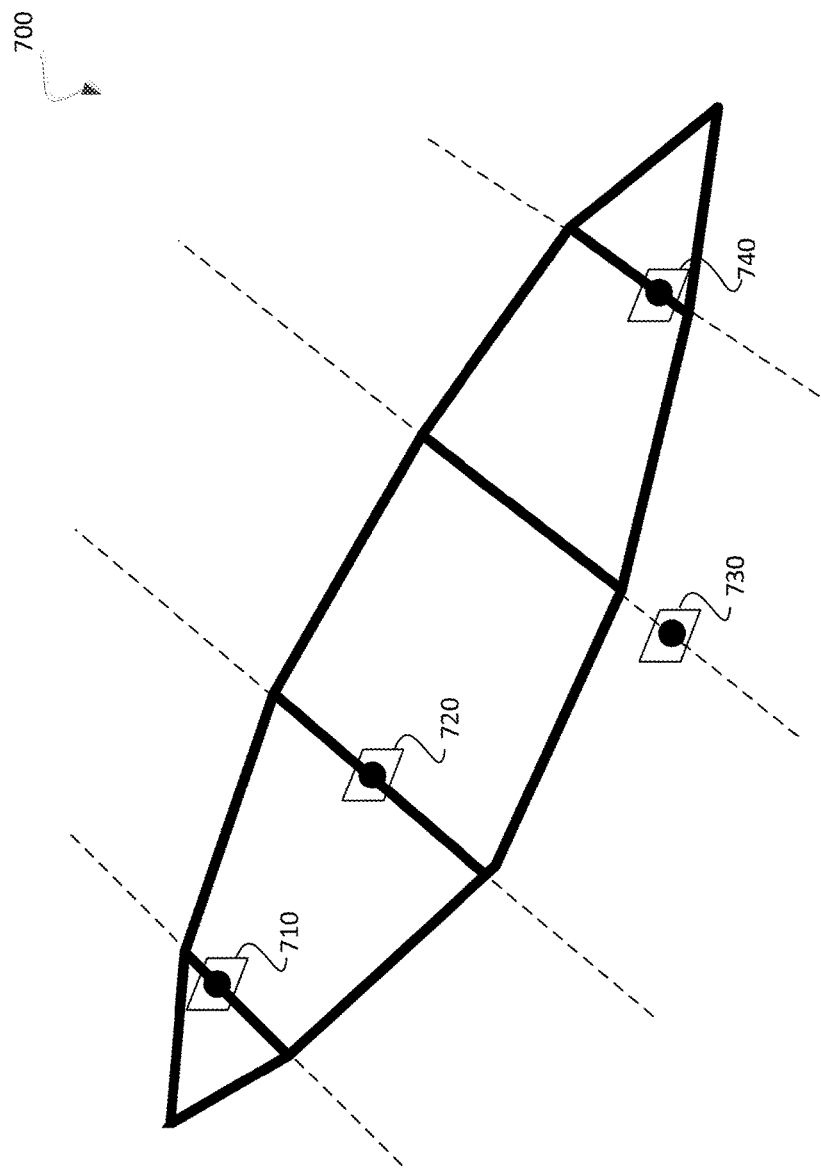
FIG. 7A illustrates an example of the placement of guide planes at locations based on the smoothed parametric line values in accordance with some embodiments of the present disclosure.

FIG. 7A illustrates an example of the placement 700 of guide planes at locations based on the smoothed parametric line values. In general, the guide planes may be placed by the guide plane component 950 of FIG. 9.

As shown in FIG. 7A, guide planes may be generated based on a mesh that does not have collapsed edges as a result of a polychord collapse operation. For example, each guide plane may be generated based on placements at a position relative to the vertices of an edge based on the smoothed parametric line value for a corresponding naïve vertex that has replaced the edge. For example, as previously described with respect to FIG. 6, a first smoothed or adjusted parametric line value may be 0.75. Thus, the placement of the guide plane 710 onto the edge that was replaced by the naïve vertex may be between the first and second vertices of the corresponding edge. For example, as shown, the guide plane 710 is generated based on a placement on the edge at a position of 0.75 that is closer to the second original vertex. Similarly, the guide plane 720 may be generated based on a placement between its respective original vertices of its edge as the smoothed parametric line value is 0.5. Additional guide planes 730 and 740 may be generated based on a placement on or relative to other edges based on other smoothed parametric line values (e.g., a negative number or another smoothed parametric line value between '0' and '1.'). Each of the guide planes may be considered an additional face that is to be used in a mesh simplification process in conjunction with the mesh.

Figure 7B:
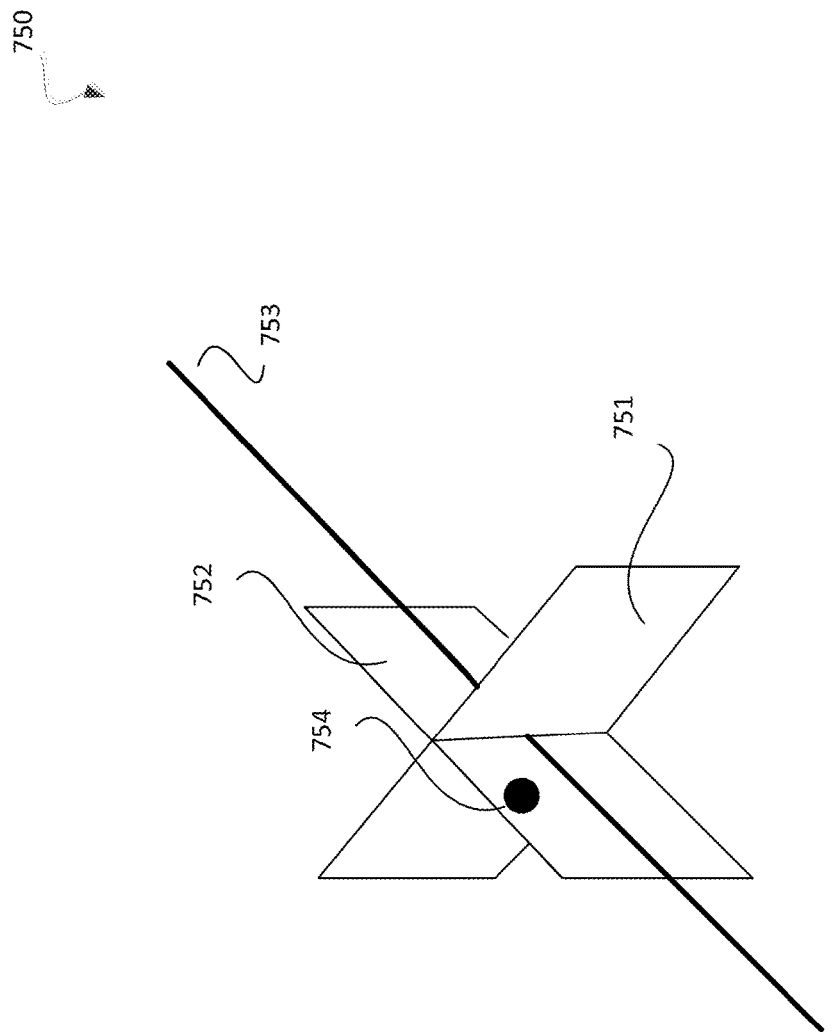
FIG. 7B illustrates an example of the placement of a second set of guide planes at locations in accordance with some embodiments of the present disclosure.

FIG. 7B illustrates an example of the placement 750 of a second set of guide planes at locations associated with a mesh. In general, the guide planes may be placed by the guide plane component 950 of FIG. 9.

As shown in FIG. 7B, a pair of guide planes may be associated with a location on an edge 753 relative to a collapse point of a naïve vertex 754. For example, a first guide plane 751 may be provided based on a location on the edge 753 based on an adjusted parametric line value corresponding to the naïve vertex 754 relative to the vertices of the edge 753 as previously described. The second guide plane 752 may be provided at the location associated with the first guide plane 751 and in a right angle to the first guide plane 751. The providing of the second guide plane 752 as another input in conjunction with the first guide plane 751 to a mesh simplification operation (e.g., the QEM process) may result in the adjusted vertex that replaces the edge 753 to be closer to the edge 753.

Thus, a pair of guide planes may be provided as inputs to a mesh simplification operation for each edge of the mesh that is to be collapsed. The first guide plane of the pair may result in the location corresponding to the adjusted vertex being at a position along the edge that is to be replaced or collapsed and the second guide plane of the pair may result in the location corresponding to the adjusted vertex being at a position closer to the edge.

Figure 8:
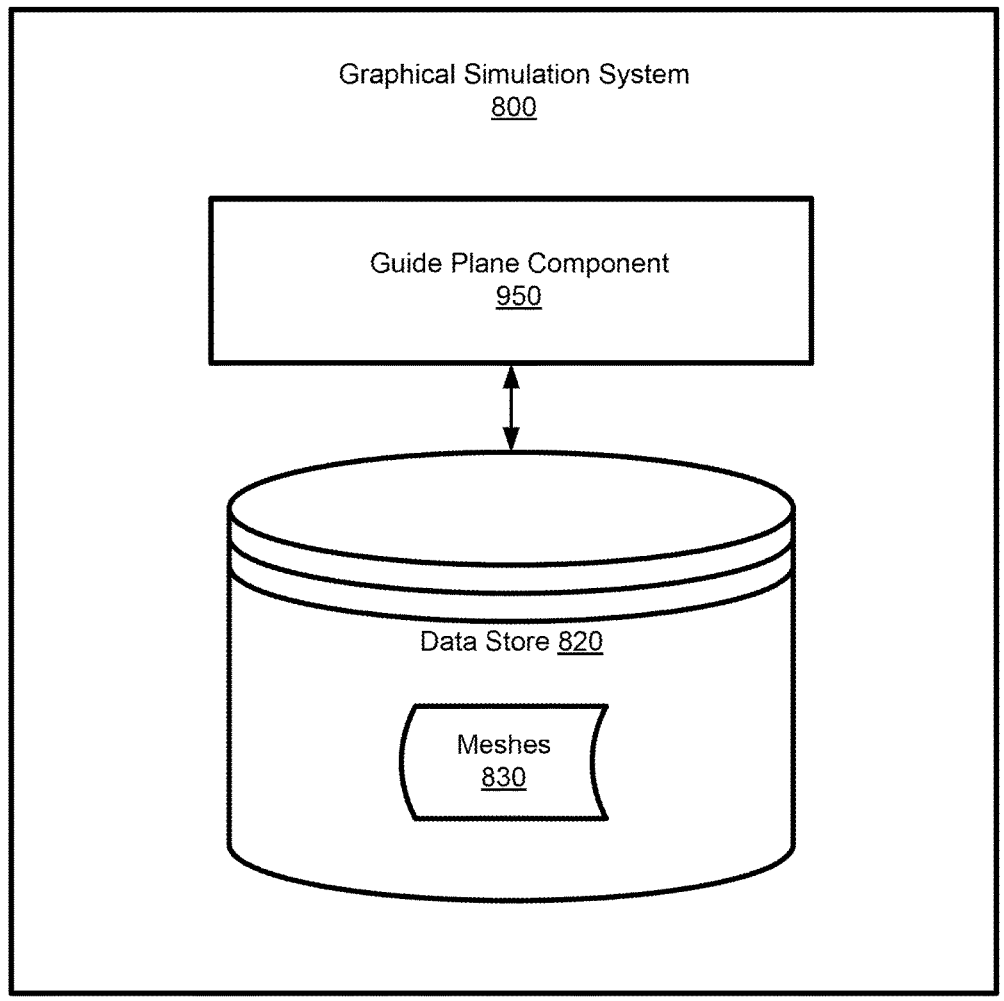
FIG. 8 illustrates a high-level component diagram of an illustrative example of a graphical simulation system.

FIG. 8 depicts a high-level component diagram of an illustrative example of a graphical simulation system 800. One skilled in the art will appreciate that other architectures for graphical simulation system 800 are possible, and that the implementation of a computer system utilizing examples of the disclosure are not necessarily limited to the specific architecture depicted by FIG. 8.

As shown in FIG. 8, the graphical simulation system 800 may include a guide plane component 950 and a data store 820 (e.g., one or more magnetic hard disk drives, a Universal Serial Bus [USB] solid state drive, a Redundant Array of Independent Disks [RAID] system, a network attached storage [NAS] array, etc.). The graphical simulation system 800 may be a server, a mainframe, a workstation, a personal computer (PC), a mobile phone, a palm-sized computing device, etc. Graphical simulation system may generate and maintain simulated objects for use in a video game. For example, graphical simulation system can be accessed by a user via a graphical user interface to create an object for use in a video game based on data of meshes 830. Alternatively, graphical simulation system may be used as a runtime component of a video game, providing real time modifications to objects during execution of the video game (e.g., performing mesh simplification operations with objects viewed within a video game).

The guide plane component 950 may provide guide planes for a mesh as previously described. In certain implementations, the guide plane component 950 may be invoked by a graphical user interface to select graphical assets for an object. For example, a user interface may permit a user to select a mesh that is to be provided in a video game.

Data store 820 may store information related to graphical assets that may be used to build an object for a video game. Data store 820 may include data of meshes 830 which may store meshes that have not been simplified for graphical assets available in the graphical simulation system 800 (e.g., meshes that may be used to render an object within a video game).

Figure 9:
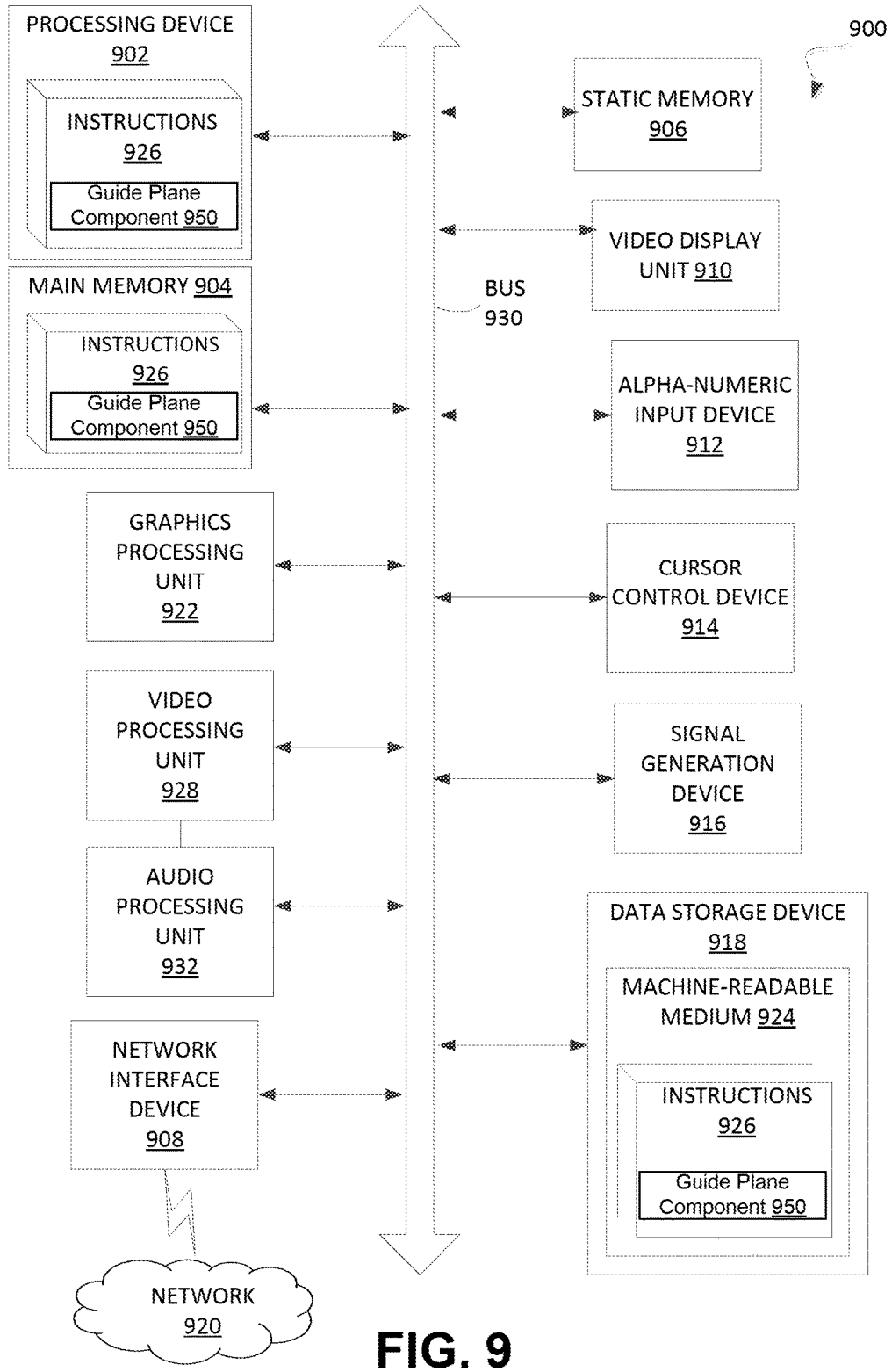
FIG. 9 is a block diagram of an example computer system operating in accordance with the disclosure described herein.

FIG. 9 illustrates an example machine of a computer system 900 within which a set of instructions, for causing the machine to perform any one or more of the methodologies discussed herein, may be executed. In general, the computer system 900 may correspond to the graphical simulation system 800 of FIG. 8. In some embodiments, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (S 1B), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), video processing unit 928, and audio processing unit 932.

The data storage device 918 may include a machine-readable storage medium 924 (also known as a computer-readable medium) on which is stored one or more sets of instructions or software 926 embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In one implementation, the instructions 926 include instructions to implement functionality corresponding to a guide plane component 950 that may perform methodology described herein. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium"

shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs). EPROMs. EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   receiving a mesh comprising a polychord with a plurality of edges;
   performing a first mesh simplification operation with the mesh to remove the plurality of edges of the polychord and to generate a first simplified mesh;
   generating a plurality of guide planes based on the first simplified mesh;
   performing, by a processing device, a second mesh simplification operation with a combination of the mesh with the plurality of guide planes to remove the plurality of edges of the polychord based on the plurality of guide planes and to generate a second simplified mesh; and
   compiling the second simplified mesh into a video game that is configured to render the second simplified mesh.

2. The method of claim 1, further comprising:
   determining a first set of vertices of the first simplified mesh that have replaced the plurality of edges of the polychord that have been removed;
   generating a plurality of parametric line values for the first set of vertices based on respective locations of each vertex of the first set of vertices relative to a pair of vertices associated with a corresponding edge of the polychord that each vertex has replaced; and
   determining locations on the mesh for each of the plurality of guide planes based on the plurality of parametric line values, wherein the generating of the plurality of guide planes is based on the determined locations.

3. The method of claim 2, further comprising:
   for each vertex of the first set of vertices, receiving one or more parametric line values for one or more adjacent vertices;
   adjusting the plurality of parametric line values for each vertex of the first set of vertices based on the one or more parametric line values for the one or more adjacent vertices for each of the vertices, wherein the determining of the locations on the mesh for each of the plurality of guide planes is further based on the adjusted plurality of parametric line values.

4. The method of claim 1, wherein the first mesh simplification operation and the second mesh simplification operation each correspond to a polychord collapse operation, and wherein each of the first simplified mesh and the second simplified mesh have fewer edges than the mesh.

5. The method of claim 1, further comprising:
   determining locations of each vertex of a first set of vertices that have replaced the removed plurality of edges relative to a pair of vertices that are connected by a corresponding edge of the removed plurality of edges; and
   providing the plurality of guide planes based on the determined locations as an input to the second mesh simplification operation.

6. The method of claim 1, wherein the plurality of guide planes are at positions normal to the plurality of edges of the polychord when the plurality of guide planes are combined with the mesh.

7. The method of claim 1, wherein the generating of the plurality of guide planes is based on an average length of edges of the mesh or an average size associated with faces of the mesh, wherein each of the plurality of guide planes are smaller than the average length of the edges of the mesh or smaller than the average size of the faces of the mesh.

8. A system comprising:
a memory to store a mesh comprising a plurality of edges; and
a processing device, operatively coupled to the memory, to:
receive the mesh comprising the plurality of edges;
generate a plurality of guide planes based on the mesh; and
perform a mesh simplification operation on a combination of the mesh with the plurality of guide planes to remove the plurality of edges of the mesh; and
compile a result of the mesh simplification operation into a video game that is configured to render the result of the mesh simplification operation.

9. The system of claim 8, the processing device is further to:
perform a first mesh simplification operation with the mesh to remove the plurality of edges and to generate a first simplified mesh;
determine a first set of vertices of the first simplified mesh that have replaced the plurality of edges that have been removed;
generate a plurality of parametric line values for the first set of vertices based on respective locations of each vertex of the first set of vertices relative to a pair of vertices associated with a corresponding edge that each vertex has replaced; and
determine locations on the mesh for each of the plurality of guide planes based on the plurality of parametric line values, wherein the plurality of guide planes are generated based on the determined locations.

10. The system of claim 9, wherein the processing device is further to:
for each vertex of the first set of vertices, receive one or more parametric line values for one or more adjacent vertices;
adjust the plurality of parametric line values for each vertex of the first set of vertices based on the one or more parametric line values for the one or more adjacent vertices for each of the vertices, wherein to determine the locations on the mesh for each of the plurality of guide planes, the processing device is further to determine the locations based on the adjusted plurality of parametric line values.

11. The system of claim 8, wherein the mesh simplification operation corresponds to a polychord collapse operation, and wherein the plurality of edges corresponds to a polychord.

12. The system of claim 8, wherein the processing device is further to:
perform a first mesh simplification operation with the mesh to remove the plurality of edges; and
determine locations of each vertex of a first set of vertices that have replaced the removed plurality of edges relative to a pair of vertices that are connected by a corresponding edge of the removed plurality of edges, wherein the plurality of guide planes are generated based on locations on the plurality of edges of the mesh that were removed by the first mesh simplification operation based on the determined locations.

13. The system of claim 8, wherein the plurality of guide planes are at positions normal to the plurality of edges.

14. The system of claim 8, wherein to generate the plurality of the guide planes based on the mesh, the processing device is further to generate the plurality of guide planes based on an average length of edges of the mesh or an average size associated with faces of the mesh, wherein each of the plurality of guide planes are smaller than the average length of the edges of the mesh or smaller than the average size of the faces of the mesh.

15. A non-transitory computer readable storage medium, having instructions stored therein, which when executed by a processing device, cause the processing device to:
receive a mesh comprising a polychord with a plurality of edges;
receive a plurality of collapse points associated with the plurality of edges of the polychord;
smooth a plurality of values associated with the plurality of collapse points to generate a plurality of smoothed values;
collapse the plurality of edges of the polychord in the mesh based on the plurality of smoothed values that are associated with the plurality of collapse points; and
compile the mesh with the collapsed plurality of edges of the polychord into a video game that is configured to render the mesh with the collapsed plurality of edges of the polychord.

16. The non-transitory computer readable storage medium of claim 15, wherein to collapse the plurality of edges of the polychord in the mesh based on the smoothed values that are associated with the plurality of collapse points, the processing device is further to:
generate a plurality of guide planes based on the mesh and the smoothed values; and
perform a polychord collapse operation on the mesh and the plurality of guide planes.

17. The non-transitory computer readable storage medium of claim 16, wherein to provide the plurality of guide planes with the mesh based on the smoothed values, the processing device is further to:
determine locations for the plurality of guide planes at locations relative to the plurality of edges of the polychord based on the smoothed values.

18. The non-transitory computer readable storage medium of claim 16, wherein to generate the plurality of the guide planes based on the mesh, the processing device is further to:
generate the plurality of guide planes based on an average length of edges of the mesh or an average size associated with faces of the mesh, wherein each of the plurality of guide planes are smaller than the average length of the edges of the mesh or smaller than the average size of the faces of the mesh.

19. The non-transitory computer readable storage medium of claim 15, wherein to receive the plurality of collapse points associated with the plurality of edges of the polychord, the processing device is further to collapse the mesh based on a mesh simplification operation before the smoothing of the plurality of values.

20. The non-transitory computer readable storage medium of claim 15, wherein smoothing of the plurality of values is based on an average of corresponding values of the plurality of values that are associated with adjacent collapse points.

* * * * *